United States Patent [19]

Andrews et al.

[11] Patent Number: 4,715,049
[45] Date of Patent: Dec. 22, 1987

[54] CLOCK RECOVERY AND RETIMING SCHEME WITH SAW FILTER PHASE TRIMMING TO ACHIEVE DESIRED SYSTEM PHASE ADJUSTMENT

[75] Inventors: George E. Andrews, Fleetwood; Paul C. Davis, Reading; Dennis C. Farley; Stanley H. Kravitz, both of Coopersburg; Thrygve R. Meeker, Allentown; Owe G. Petersen, Reading; Arthur W. Schelling, Emmaus, all of Pa.

[73] Assignee: American Telephone and Telegraph Company, AT&T Bell Laboratories, Murray Hill, N.J.

[21] Appl. No.: 838,709

[22] Filed: Mar. 12, 1986

[51] Int. Cl.$^4$ .............................................. H04L 7/00
[52] U.S. Cl. ........................................ 375/106; 375/3; 375/110
[58] Field of Search .............. 375/110, 106, 113, 116, 375/118, 119, 25, 3

[56] References Cited

U.S. PATENT DOCUMENTS

| 4,169,286 | 9/1979 | Uzunoglu et al. | 375/116 |
| 4,296,389 | 10/1981 | Fuller et al. | 333/160 |
| 4,339,823 | 7/1982 | Predina et al. | 375/20 |
| 4,355,408 | 10/1982 | Scarrott | 375/110 |
| 4,442,574 | 4/1984 | Wanuga et al. | 29/25.35 |
| 4,495,431 | 1/1985 | Grudkowski | 333/154 |

OTHER PUBLICATIONS

"Acoustoelectric SAW Phase Shifter", *Appl. Phys. Letter*, vol. 31, No. 9, Nov. 1977, Crowley et al, pp. 558-560.
"Voltage Controlled Monolithic SAW . . . ", *IEEE Trans Sonics and Ultrasonics*, vol. SU-29, No. 5, Sep. 1982, Urabe, pp. 255-261.
"Optical Fiber Repeatered Transmission . . . ", *IEEE Trans. Sonics and Ultrasonics*, vol. SU-30, No. 3, May 1983, Rosenberg et al, pp. 119-126.
"Minimum Chip Count Regenerators . . . ", *ICC'83 Conference Proceedings*, Jun. 1983, Cochrane et al, pp. 686-689.
"A Highly Integrated Regenerator . . . ", *J. of Lightwave Tech.*, vol. LT-2, No. 6, Dec. 1984, Ross et al, pp. 895-900.
"Timing Recovery with SAW . . . ", *J. of Lightwave Tech.*, vol. LT-2, No. 6, Dec. 1984, Rosenberg et al, pp. 917-925.
"An Undersea Fiber-Optic Regenerator . . . ", *J. of Lightwave Tech.*, vol. LT-2, No. 6, Dec. 1984, Dawson et al, pp. 926-932.
"Analysis of Jitter Peaking Effect . . . ", *IEEE Trans. on Commun.*, vol. COM-33, No. 7, Jul. 1985, Fishman et al, pp. 654-664.

*Primary Examiner*—John W. Shepperd
*Assistant Examiner*—Michael D. Parker
*Attorney, Agent, or Firm*—Wendy W. Koba

[57] ABSTRACT

A clock recovery and data retiming circuit is disclosed which utilizes a SAW filter to form the recovered clock signal. The phase shift of the received data signal associated with various attenuation and distortion effects of the communication channel is compensated for and removed from the retimed data signal by adjusting the phase of the SAW filter.

5 Claims, 4 Drawing Figures

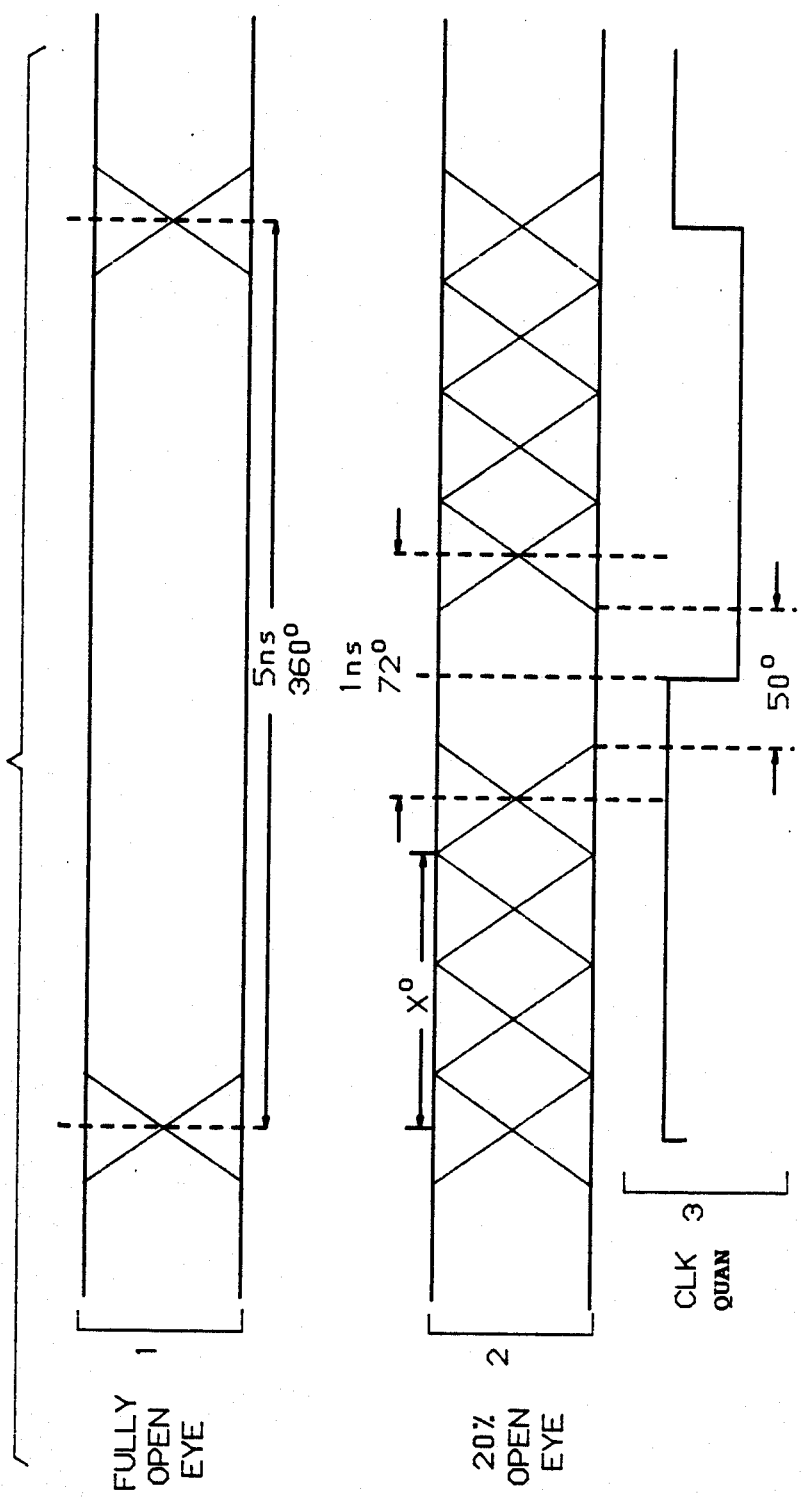

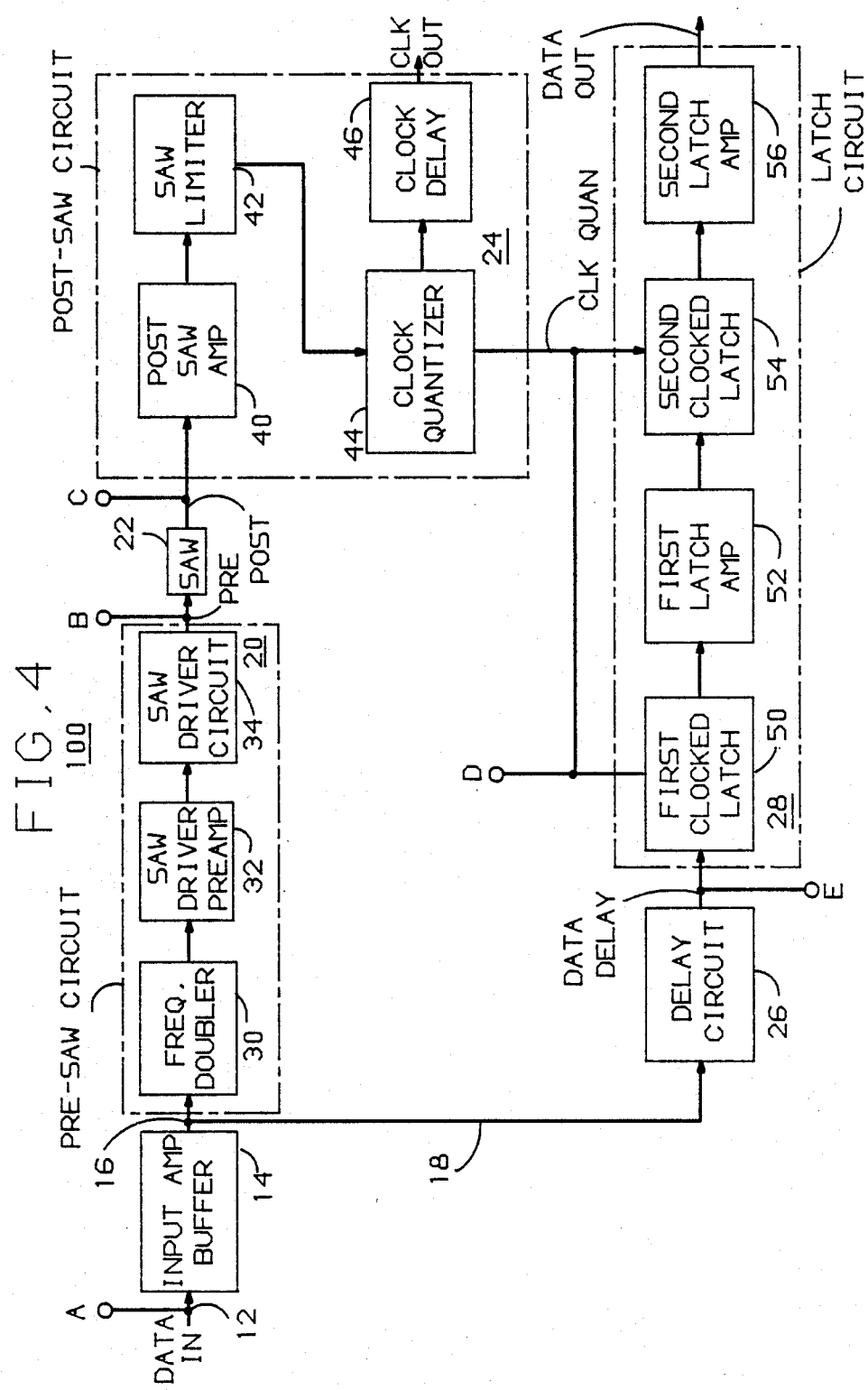

CLOCK RECOVERY AND RETIMING SCHEME WITH SAW FILTER PHASE TRIMMING TO ACHIEVE DESIRED SYSTEM PHASE ADJUSTMENT

FIELD OF THE INVENTION

The present invention relates to a clock recovery and retiming scheme and, more particularly, to a clock recovery and retiming scheme which provides the necessary phase adjustment between the received data and the recovered clock with a phase-trimmed surface acoustic wave (SAW) filter.

DESCRIPTION OF THE PRIOR ART

There exist various needs for circuits capable of providing phase-corrected signals in communication systems. One such circuit is utilized for extracting timing information from a data stream traveling along a transmission path. For exmaple, in long-haul communications system the data signal will become attenuated and variously distorted. At a number of locations along the transmission path, therefore, regenerators are utilized to filter out the distortion and retransmit a "clean" (i.e. retimed) data signal along to the next regenerator. In fairly low frequency applications, circuits employing phase-locked loops (PLL) are utilized to extract the clock information from the transmitted data signal, where the extracted clock is used to retime the data. One such arrangement is disclosed in U.S. Pat. No. 4,339,823 entitled "Phase Corrected Clock Signal Recovery Circuit" issued to J. P. Predina et al on July 13, 1982. in the Predina et al arrangement, a separate phase correction circuit, located in a feedback loop between the PLL and a bandpass filter, is utilized to provide the necessary phase correction to achieve the correct correlation between the recovered clock signal and the incoming data. The circuit, as illustrated in FIG. 8A of Predina et al utilizes a large number of discrete components to perform this phasing function. In alternative PLL clock recovery arrangements well known in the art, a piece of coaxial cable of a necessary length L is coupled to the clock recovery circuit to provide the needed phase delay. A problem with the use of coaxial cable, however, is the susceptibility of the electronic recovery circuit to changes in ambient temperature conditions, thus changing the phase delay required as a function of temperature. Thus to accommodate these changes, different lengths of coaxial cable need to be added, and the phase continuously monitored and adjusted. For long-haul communication systems which are subject to extreme variations in temperature this attribute of the coaxial cable represents a significant problem. Other obvious problems—manufacturing delays related to adjusting the length of the cable, increases in circuit expense, lack of complete circuit integration—are also related to the use of the coaxial cable.

In high bit rate applications, for example, bit rates on the order of 200 Mb/s, PLL clock recovery schemes are inadequate. In their place, recovery/regenerator circuits utilizing SAW filters have evolved. One such system is described in the article "Optical Fiber Repeatered Transmission Systems Utlizing SAW Filters" by R. L. Rosenberg et al appearing in *IEEE Transactions on Sonics and Ultrasonic*, Vol. SU-30, No. 3, May 1983 at pp. 119–126, which includes a comparison of retiming systems using SAW filters with systems using PLL retiming. An alternative arrangement is discussed in the article "An Undersea Fiber-Optic Regenerator Using an Integral-Substrate Package and Flip-Chip SAW Mounting", by P. A. Dawson et al appearing in *Journal of Lightwave Technology*, Vol. LT-2, No. 6, December 1984, pp. 926–932. As discussed in the Dawson et al article, timing phase in SAW filter retimers, like the PLL retimers discussed above, may be adjusted by trimming a piece of coaxial cable and inserting it in the timing path. The article goes on to state that "This is an unsatisfactory method because tests must be performed after each adjustment of the cable, and this is time consuming and therefore expensive in production". The Dawson et al article goes on to describe a timing phase adjustment circuit which they utilize to perform this function, where the circuit as described adds variable proportions of two signals at the clock frequency which differ in phase, nominally by 120°. Although this circuit is an improvement over the use of a piece of coaxial cable, many additional components and a current source are required to form the circuit.

Therefore, a need remains in the prior art for a phase-correcting clock recovery and retiming circuit which is capable of operating at high bit rates, is insensitive to temperature and other environmental factors, economical, and is relatively simple to manufacture.

SUMMARY OF THE INVENTION

The problem remaining in the prior art is addressed by the present invention which relates to a clock recovery and retiming scheme and, more particularly, to a clock recovery an retiming circuit which utilizes surface acoustic wave (SAW) filter that is phase-trimmed to provide the necessarsy phase adjustment.

It is an aspect of the present invention to provide a clock recovery/retiming scheme which is relatively intolerant to variations in temperature. By providing the phase adjustment through performing a phase trim of a SAW filter, instead of utilizing a piece of coaxial cable, the temperature dependence associated with the phase adjustment will track with continuous phase changes caused by temperature fluctuations of the recovery circuit.

Another aspect of the present invention is the ability to provide a fully integrated system, since no external phase adjustment device is utilized. Thus, the complete clock recovery scheme of the present invention is monolithic and can easily be housed in one package.

Yet another aspect of the present invention relates to the ability to trim the phase of the SAW device by various well-known techniques, for example, using reactive ion etching, to provide the desired phase delay with great accuracy.

These and other aspects of the present invention will become apparent during the course of the following discussion and by reference to the accompanying drawings.

BRIEF DESCRIPTION OF THE DRAWINGS

Referring now to the drawings, where like numerals represent like parts in several views:

FIG. 2 contains timing diagrams illustrating the various phase distortions which may affect the performance of a clock recovery and retiming circuit;

FIG. 4 illustrates in greater detail the exemplary circuit shown in FIG. 1.

DETAILED DESCRIPTION

As discussed briefly above, the use of repeaters and regenerators are necessary in data systems which cover long distances. In particular, long expanses of the communication medium, whether it is copper wire, optical fiber, or even air, will distort and attenuate the transmitted signal such that it would not be recoverable at the receiving end. In general, the regenerators utilize the received, distorted and attenuated data signal to extract timing information, where the restored timing signal is latched with the received signal to form the improved output data signal.

Figure 1:
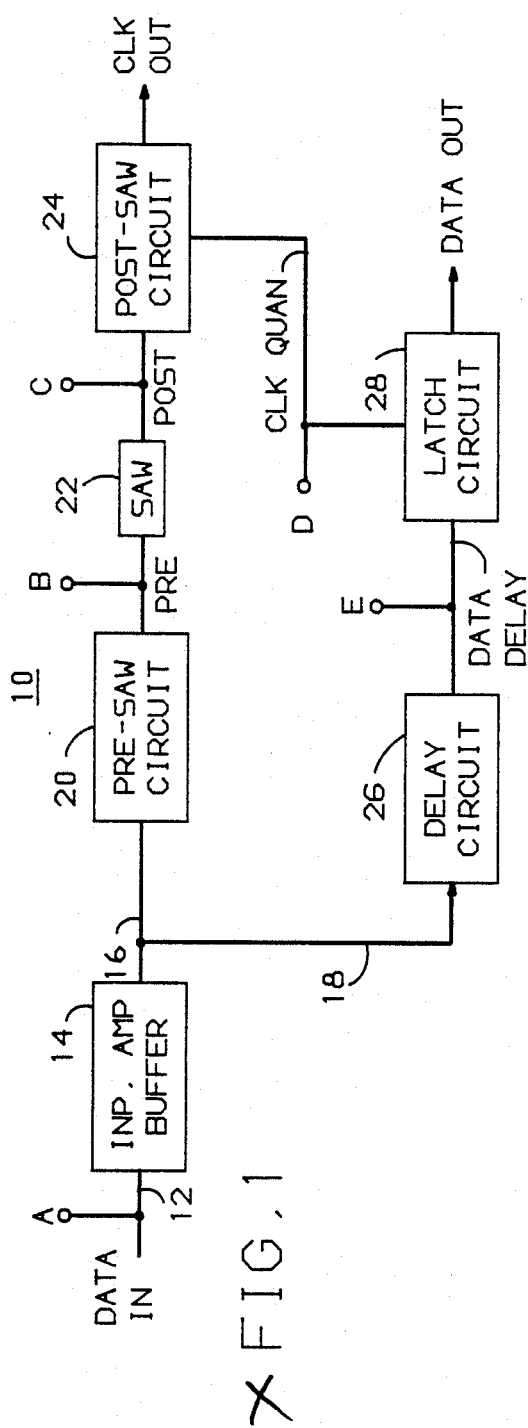
FIG. 1 illustrates an exemplary clock recovery/retiming circuit utilizing the SAW phase adjustment of the present invention.

A block diagram of an exemplary clock recovery and data retiming circuit 10 formed in accordance with the present invention is illustrated in FIG. 1. As shown, the received signal, denoted DATA IN, travels along a transmission path 12 and is applied as an input to a buffer/amplifier 14 which amplifies the received DATA IN signal to a level acceptable for the proper operation of circuit 10. Buffer/amplifier 14 provides an output signal along a first path 16 and a second path 18, where the signal traveling along first path 16 is utilized to generate the recovered clock signal, and the signal traveling along second path 18 is utilized to generate, in conjunction with the recovered clock signal, the retimed data signal.

Referring to FIG. 1, the signal traveling along path 16 is applied as an input to a pre-SAW circuit 20. As will be discussed in detail hereinafter in association with FIG. 4, pre-SAW circuit 20 comprises a number of separate circuits which perform specific functions to generate a signal from which the timing information may be extracted. The output from circuit 20, denoted $S_{pre}$, is subsequently applied as an input to a SAW filter 22, where SAW filter 22 is a relatively wideband filter with a center frequency $f_c$ equal to the known transmission rate of DATA IN. For example, in certain optical data systems, data is transmitted at 200 Mb/s. Therefore, a SAW filter utilized to recover and retime this data would have a center frequency of approximately 200 MHz. As will be disussed hereinafter with the phase-trimming aspect of the present invention, the actual center frequency may be moved by an amount of approximately ±70 KHz and still be able to recover and retime DATA IN with an acceptable bit error rate (BER). The filtered output signal from SAW filter 22, denoted $S_{post}$, subsequently passes through a post-SAW circuit 24 which, like pre-SAW circuit 20, actually comprises a number of separate circuits. These circuits, as will be described in detail hereinafter, function in general to amplify and limit output signal $S_{post}$ to provide clock signal, denoted CLK OUT, which has the required steep and clean transitions to latch with DATA IN to form the output data signal, denoted DATA OUT.

In order to provide the correct output data signal, the received signal, DATA IN, is first passed through a delay circuit 26 which functions to simulate, using similar circuitry and layout design, the clock recovery path described above. This simulation thus provides a signal path for DATA IN which is subject to the same temperature, power supply, and processing variations as the clock recovery signal path. Therefore, any changes in the phase of the clock signal related to these variations will also be experienced by the DATA IN signal. Thus, the monolithic clock recovery scheme of the present invention will insure a matched delay, regardless of the variations, between the data and clock signals. Conventional prior art clock recovery/retiming arrangements, which utilize discrete components, cannot guarantee this matching capability. In fact, if such a delay circuit were not used in the present invention, the ideal timing could not be maintained, with respect to all of these variables, and DATA IN would reach the latching part of the circuit well before the recovered clock, resulting in the generation of an incorrect DATA OUT signal. As will be described in detail hereinafter, the elements forming delay circuit 26 are designed using the same layout techniques as used in the formation of pre-SAW circuit 14 and post-SAW circuit 24 so as to provide the best match in delay paths. Additionally, since both the clock recovery and delay circuits will be subject to the same temperature conditions, any change in signal delay which is a function of temperature will allow both circuits to track together and provide the same delay. The output from delay circuit 26, denoted DATA DELAY is then applied as a first input to latch circuit 28, where the recovered clock signal CLK QUAN is applied as a second input to latch circuit 28. Latch circuit 28 can be thought of as a flip-flop, where the signal appearing at the DATA DELAY input will appear at the output during a transition of the CLK QUAN signal. The output of latch circuit 28, therefore, is the retimed data signal DATA OUT, which may then be injected back into the transmission path.

As mentioned above, the phase of the received DATA IN signal may have been disturbed by the various affects of attenuation and distortion. FIG. 2 contains what is referred to as an eye diagram which illustrates the problem this phase shift may create. In the absence of any phase distortion, the transmitted signal will resemble the signal shown along line 1 of the diagram, where this type of signal is referred to as a fully open eye. As shown, for a signal transmitted at a 200 Mb/s rate, a period of 5 nsec is required for the full 360° phase shift. As the phase becomes distorted, the space, or eye opening, between these transitions will shrink, as seen in the next signal, illustrated along line 2, which has a 20% open eye. As shown, the phase of the incoming signal may shift by an amount of, for example, X°. Thus, the eye opening during which a correct decision can be made as to the value of the data being transmitted has decreased from the full 360° to approximately 72°. It is essential, therefore, that the phase of recovery/retiming circuit 10 as illustrated in FIG. 1 be adjusted to account for this probable shift of X°, and provide a retimed clock signal which will fall in the center opening, as indicated by the CLK QUAN signal contained in line 3 FIG. 2.

In accordance with the present invention, this phase adjustment is accomplished by designing filter 22 to have a phase delay within a certain manufacturable range, and then trimming the phase of SAW filter 22 obtain the desired phase value. Well-known techniques, for example, reactive ion etching, plasma etching, or ion beam milling, may be utilized to trim the phase of the filter by lengthening the path the acoustic signal must travel. This trim also results in trimming the frequency or the filter, i.e., moving the center frequency of the filter, where the relation between phase and frequency is approximately 0.45°/KHz. U.S. Pat. No. 4,442,574 issued to S. Wanuga et al on Apr. 17, 1984 includes a complete description of the process of frequency trimming a SAW filter. However, this work, nor any other, discloses or even suggests utilizing this technique to adjust the phase of a SAW device to provide a desired system phase adjust, as disclosed in the present invention.

In order to determine the amount of phase adjustment required for SAW filter 22 ($\Delta\Phi$), various phase delays are measured and compared throughout recovery/retiming circuit 10. Referring to FIG. 1, the phase shift along the clock recovery path is determined by measuring the phase shift between point A at the input to buffer/amplifier 14 and point B at the input to SAW filter 22 ($\Phi_1$), and adding to that the phase shift between point C at the output of SAW filter 22 and point D at the clock input to latch circuit 28 ($\Phi_2$). The phase shift along the data retiming path is measured in a similar fashion between point A and point E at the data input to latch circuit 28 ($\Phi_3$). Ideally, these phase shifts ($\Phi_1+\Phi_2$, $\Phi_3$) would match, and SAW filter 22 could be used without any phase trimming being required. However, this would occur only for a system which exhibited a fully open eye, as shown in line 1 of FIG. 2. In most systems, however, this will not be the case and some amount of phase adjustment will be required. Therefore, in accordance with the present invention, the phase of SAW filter 22 may be adjusted by trimming to provide the desired shfit of X°, where X° is representative of the difference ($\Delta\Phi$) between the sum of the clock line phase between $\Phi_1$ and $\Phi_2$ and the data line phase shift $\Phi_3$. That is, $\Delta\Phi=(\Phi_1+\Phi_2)-\Phi_3$.

This method of providing the necessary phase adjustment by actually phase-trimming the SAW filter has many advantages as compared with prior art arrangements which included a separate circuit to perform this function. It is obvious that the resulting structure of the present invention is smaller, since no additional components are required. Further, since SAW filter 22 and the rest of clock recovery circuit 10 can be completely integrated to form a monolithic structure housed in a single package, both filter 22 and circuit 10 will be subject to the same temperature variations, as discussed above. Therefore, SAW filter 22 can be made with a positive (or negative) temperature coefficient (of phase) which allows $\Delta\Phi$ to more closely match the rest of the integrated circuit's temperature dependence. Additionally, the arrangement is compatible with existing manufacturing techniques, since the phase adjustments may be measured at the test points A, B, C, D, and E during the manufacturing process, and a SAW filter with the necessary phase adjustment $\Delta\Phi$ may simply be dropped into place in the circuit at the end of the process. A variation of this approach, referred to as a post office approach, utilizes a set of SAW filter "bins", where each bin has a predetermined phase delay, perhaps incrementing in stages of 10° for each bin. Once the desired phase adjustment is known, a SAW filter is selected from the bin having the closest manufactured phase delay and the trimmed slightly to provide the needed value. For example, to provide a phase shift of 27°, a SAW filter from the 30° bin would be selected and then trimmed slightly to provide the 27° degree value. This post office technique further increases the efficiency of the manufacturing operation. As a more restrictive approach, SAW filters with a single phase delay value $\Delta\Phi$ could be used, where only the circuits coming off the line which needed that specific $\Delta\Phi$ value would be used, the others thrown away. This arrangement, obviously, is more expensive. However, as manufacturing techniques improve, it is possible that most circuits coming off the line would exhibit a phase shift of ±5°, and SAW filters with a single phase shift could be used, with a minimum of trimming.

Figure 3:
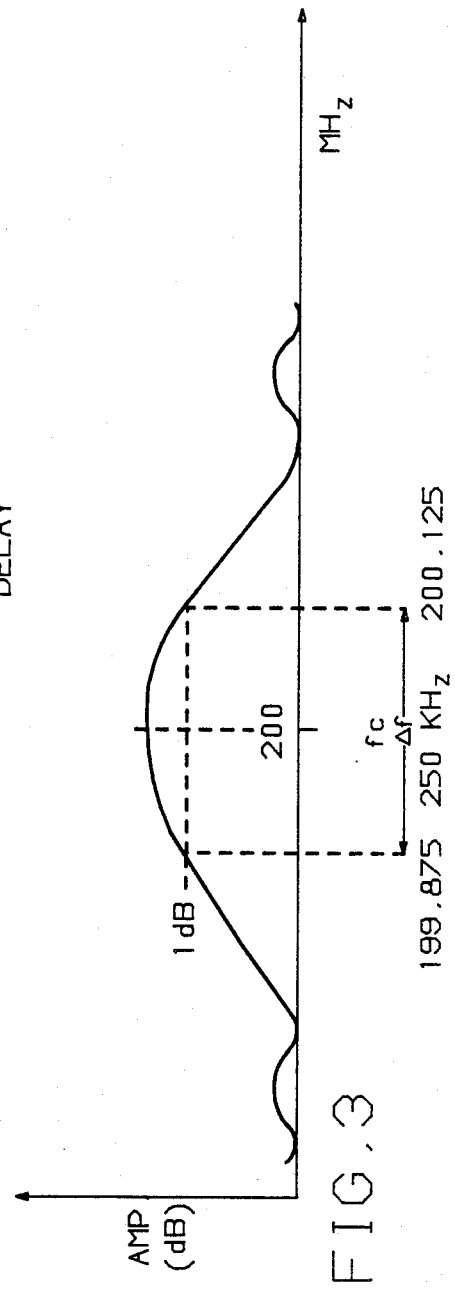
FIG. 3 illustrates an exemplary output frequency response of a SAW filter used for recovering a clock signal in accordance with the present invention.

As stated above, performing a phase trim on a SAW filter also results in moving the center frequency of the filter. The maximum amount of phase trim which may be performed without moving the center frequency of the filter out of a desired operating range can be determined in the following manner utilizing the exemplary post-SAW waveform illustrated in FIG. 3. For this particular example, a data bit rate of 200 Mb/s is chosen, and hence the SAW filter used would have an ideal center frequency of 200 MHz, denoted $f_c$ in FIG. 3. It is to be understood, however, that the principles of the present invention are independent of the system's bit rate. The waveform of FIG. 3 also illustrates the 1dB points around the center frequency $f_c$, where these points are considered to be the tolerable limits of the filter band in both directions around the center frequency which will provide a recovered clock signal at the desired rate within the predetermined bit error rate. For a given Q of, for example, 400, a 3 dB bandwith of SAW filer 22, denoted $\Delta f$, can be calculated to be 500 Khz, since $Q=f_c/\Delta f$. Therefore, to achieve the more stringent 1 dB bandwidth, the value of 500 KHz is halved, to arrive at a 1dB bandwidth of 250 KHz. There exist other system variations, however, which must be considered in determining the exact bandwidth available for the SAW filter. These variations include: (1) the clock used at the source in forming the data signal, which may vary by as much as +15 KHz; (2) aging effects of the SAW device, which at 100° C. for ten years, may result in a frequency drift of 8 KHz; (3) cyclic variations in the SAW filter ambient temperature, which from 30° C. to 100° C., may add a drift component of 32 KHz; and (4) drifts in the integrated circuit components which may reach a value of 55 KHz. Thus, these four system variations add a frequency drift of 110 KHz to the 250 KHz bandwidth discussed above. Subtracting this drift from the bandwidth results in a total bandwith of only 140 KHz, or ±70 KHz, around the 200 MHz center frequency. This 140 KHz value is the frequency limitation to be used in calculating the available limits for the phase trimming. Since as stated above the SAW filter phase is related to frequency by the expression 0.45°/kHz, the total phase trim range for this exemplary arrangement will be 0.45°×140 kHz, or 63° of total phase trim range. Therefore, a phase adjustment of up to 63° can be made on an exemplary SAW filter with a center frequency of 200 MHz while maintaining the center frequency inside the ±1 dB limit for bit error rate requirements. Obviously, the same technique can be used to determine the phase trim range for any other center frequency, and also for any other bandwidth limitations, where, for example, ±3 dB is often an acceptable bandwidth limitation.

FIG. 4 illustrates in a more detailed form a clock recovery and retiming circuit 100 of the present invention. In particular, the specific components forming pre-SAW circuit 20, post-SAW circuit 24, and latch circuit 28 are included in the arrangement illustrated in FIG. 4. It is to be understood, however, that such an arrangement is exemplary only and various other means may be utilized to perform the various functions described before in association with FIG. 1. Referring to the figure, pre-SAW circuit 20 is seen to include a frequency doubler 30 which is responsive to the input signal DATA IN. Frequency doubler 30 functions to rectify the DATA IN signal such that negative-going values of DATA IN are reversed in polarity. The rectified output signal from frequency doubler 30 is subsequently applied as an input to a SAW driver preamplifier 32 which performs an amplification on this rectified signal (of 1 volt peak-to-peak, for example). The following SAW driver circuit 34 functions to provide a low impedance source capable of driving SAW filter 22.

Post-SAW circuit 24, as shown, comprises a number of separate components which are used to form a square-wave clock signal from the output of SAW filter 22. In particular, a post SAW amplifier 40 is used to provide a current to voltage conversion (with gain) of the filtered output from SAW filter 22. The amplified output signal is subsequently passed through a post SAW limiter 42 which is used to clip the amplified signal at a predetermined magnitude to protect the rest of the circuit from a strong signal (for example, DATA IN=10101010) which would overdrive the remaining components. The limited output signal is then applied as an input to a clock quantizer 44 which quantizes this output signal from SAW filter 22 so as to form a square-wave replica of the SAW filter output, denoted CLK QUAN. The output signal CLK QUAN is subsequently passed through a clock delay circuit 46, where clock delay circuit 46 is utilized to insure that the final output signal CLK OUT will be synchronous with the final data signal DATA OUT.

As seen by reference to FIG. 4, the quantized SAW output signal CLK QUAN from clock quantizer 44 is also applied as an input to latch circuit 28. As shown in FIG. 4, latch circuit 28 includes two separate latching stages, each triggering on CLK QUAN. The two stage arrangement, which can be considered as a master/slave clocking arrangement, proves an output signal which is in phase with the CLK QUAN signal. It is to be understood, however, that a single stage latch, which produces an output signal 180° out of phase with the input signal, may also be utilized in practicing the invention, where an inverter stage may be added to the output of the single stage latch to provide an output data signal with the correct polarity. Referring to FIG. 4, latch circuit 28 includes a first clocked latch 50 which is responsive to both DATA DELAY and the CLK QUAN signals. Thus, the decision of a DATA DELAY "high" or "low" state will be made in the center of the data eye diagram and latched into the proper condition through first clocked latch 50 when triggered by the CLK QUAN signal. This latched data signal is then applied as an input to a first latch amplifier 52 which is used to restore a fast rise and fall time and add a minimal amount of delay to the retimed data signal so as to prevent a race condition. A second clocked latch 54, like first clocked latch 50, is also responsive to the CLK QUAN output from clock quantizer 44. The output from first latch amplifier 52 is applied as a second input to second clocked latch 54. Therefore, when triggered by CLK QUAN, the latched data signal will be retimed by second clocked latch 54. As before, a second latch amplifier 56 is used to provide restore a fast rise and fall time to the signal, where the output of amplifier 56 is the retimed data signal, DATA OUT, which may then reinserted onto the transmission line. Test points A, B, C, D and E associated with determining the phase delays $\Phi_1$, $\Phi_2$ and $\Phi_3$ prior to insertion of SAW filter 22 are also illustrated in FIG. 4. Ideally, ring oscillators may be incorporated into the circuit design between the appropriate points to measure the phase delay, where the avoidance of using external components to measure this delay will insure the accuracy of the result.

What is claimed is:

1. Apparatus for recovering a clock signal from a received data signal and retiming said received data signal, said apparatus including
   means for performing data retiming; and
   means for performing clock recovery, said means for performing clock recovery including a SAW filter configured to provide a phase delay ($\Delta\Phi$) equal to the difference in phase between the data retiming means ($\Phi_1 + \Phi_2$) and the clock recovery means exclusive of said SAW filter ($\Phi_3$).

2. Apparatus as defined in claim 1, wherein the means for performing clock recovery further comprises
   a pre-SAW circuit responsive to the received data signal for adapting said received data signal into the form acceptable to the SAW filter and providing as an output a driving signal for said SAW filter;
   a post-SAW circuit responsive to the output signal from said SAW filter and generating a square-wave clock signal from said received data signal; and
   the means for performing data retiming further comprises
   delay means responsive to the received data signal for providing a time delay to said received data signal equal in value to the time delay fluctuations associated with forming said square-wave clock signal, said delay means generating as an output a delayed data signal; and
   a latching circuit responsive to both said square-wave clock signal and said delayed data signal for generating as an output the retimed data signal.

3. Apparatus as defined in claim 2 wherein the pre-SAW circuit further comprises
   frequency doubling means responsive to the received data signal for providing at the output thereof a rectified data signal;
   amplifying means responsive to said received data signal for providing at the output thereof an amplified rectified data signal; and
   SAW filter driving means responsive to the amplified rectified data signal for adapting said amplified rectified data signal into a form capable of driving the SAW filter.

4. Apparatus as defined in claim 2 wherein the post-SAW circuit further comprises
   amplifying means responsive to the output signal from the SAW filter for providing as an output an amplified filtered output signal;
   limiting means responsive to said amplified filtered output signal for providing as an output a signal limited between a set of predetermined values; and
   quantizing means responsive to the output from said limiting means for providing a quantized output signal, said quantized output signal being the square-wave clock signal.

5. Apparatus as defined in claim 2 wherein the latching circuit further comprises
   a first clocked latch responsive to both the delayed data signal and the square-wave clock signal for latching the data at a predetermined value during transitions of said square-wave clock signal;

a first latch delay means responsive to the output signal of said first clocked latch for restoring rise and fall times and adding a predetermined time delay to said latched data signal;

a second clocked latch responsive to both said square-wave clock signal and the output of said first delay means for generating the retimed data signal; and a second latch delay means responsive to said retimed data signal for restoring rise and fall times to said retimed data signal.

* * * * *